United States Patent [19]

Mayer et al.

[11] Patent Number: 5,001,717
[45] Date of Patent: Mar. 19, 1991

[54] CAVITY DUMP LASER CONTROLLER

[75] Inventors: Richard C. Mayer, University City; John A. Haack, Froistell, both of Mo.; William E. Heafner, Godfrey, Ill.; Steve E. Thielker, Florissant, Mo.

[73] Assignee: McDonnell Douglas Corporation, St. Louis, Mo.

[21] Appl. No.: 495,718

[22] Filed: Mar. 19, 1990

[51] Int. Cl.⁵ .............................................. H01S 3/10
[52] U.S. Cl. ...................................... 372/25; 372/38; 372/26; 372/12
[58] Field of Search ....................... 372/25, 38, 69, 26, 372/12, 10

[56] References Cited

U.S. PATENT DOCUMENTS 4,665,524  5/1987  Cotfer ................................... 372/25
4,930,901  6/1990  Johnson et al. ........................ 372/25

Primary Examiner—Léon Scott, Jr.
Attorney, Agent, or Firm—Benjamin Hudson, Jr.; Timothy H. Courson

[57] ABSTRACT

There is provided by this invention a controller for cavity dumping a laser which maintains a consistent output pulse energy level. The constant output pulse energy level is due to the clipping of the circulating power within the laser's cavity upon its reaching a threshold level. In order to further insure that the output pulses are of equal energy even within a laser that is pulse interval modulated, the threshold level for the circulating power within the laser's cavity is adjusted according to a predetermined ratio of the number of times the circulating power is clipped to the number of times the circulating power is not clipped so that the predetermined ratio is maintained.

5 Claims, 6 Drawing Sheets

CAVITY DUMP LASER CONTROLLER

BACKGROUND OF THE INVENTION

1. Field of the Invention

This invention relates generally to methods of controlling pulsed lasers, and more particularly, to a method of cavity dumping lasers to generate high repetition rates with frequency modulation.

2. Description of the Prior Art

In applications of lasers to communication systems there exist a requirement that the lasers operate at a high frequency, generally, 100 to 1000 kilopulses per second (kpps). These pulses can be generated by cavity dumping the laser. In order to achieve bit error rates of $10^{-6}$ or lower, the energy per pulse must be stabilized. The percentage of pulses below a specific minimum energy level must be very small. While cavity dumping at a constant frequency may be stable, data encoding by pulse interval modulation, as well as various noise sources, introduce large variations in output pulse energy. A method of controlling the buildup of circulating power in the laser must be implemented, so that the amount of energy in the cavity at the time of cavity dumping is nearly constant. The method of control must be adaptable to work over the operating range of the laser. In two-way communication systems, the laser controls must not cause energy to leak out of the laser between pulses, since such energy increases the background noise for the receiving part of the communication system. It would be desirable if there was provided a laser and laser controller that regulated the circulating power buildup, thereby controlling the output pulse energy levels and providing a control loop which maintains a low level of circulating power in the laser cavity between pulses until a fixed time before the next output pulse would occur.

SUMMARY OF THE INVENTION

There is provided by this invention a controller for cavity dumping a laser having a detection means for monitoring the circulating power of the laser cavity and a control means for switching off the circulating power at a predetermined threshold level. Thus, the output pulse level of high frequency pulsed laser can be maintained approximately constant.

BRIEF DESCRIPTION OF THE PREFERRED EMBODIMENT

Figure 1:
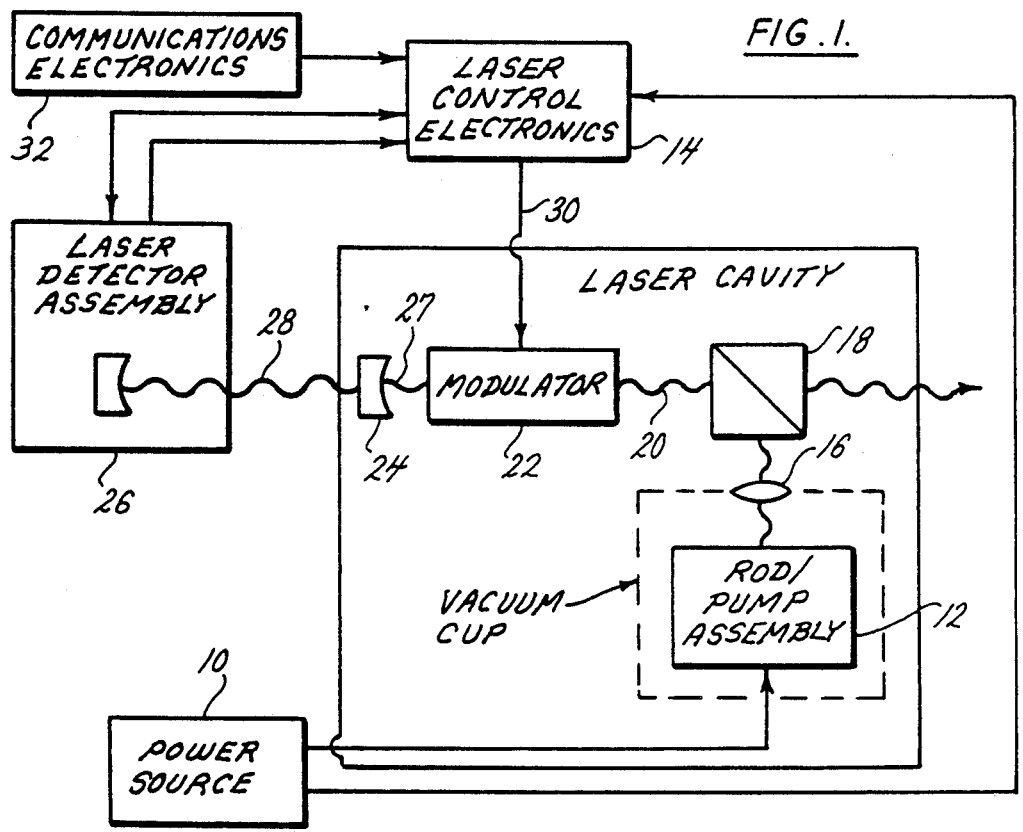
FIG. 1 illustrates schematically a laser and laser controller incorporating the principles of this invention.

FIG. 1 illustrates a laser and control electronics having a cavity dumping control circuit incorporating the principles of this invention. The power source 10 provides power to both the rod/pump assembly 12 and to the laser control electronics 14. The rod/pump assembly's output is focused by a lens 16 onto the polarizer 18. The polarizer directs the beam 20 through the modulator 22 and onto the end mirror 24 which reflects the beam 27 back into the laser cavity. A small amount of light 28 leaks through the end mirror 24 and enters the laser detector assembly 26. The laser detector assembly measures the level of the circulating power within the cavity. The laser detector assembly scales the circulating power level to within 0 to 5 volts and transmits the level to the laser control electronics 14. The reflected beam 27 again passes through the modulator 22 which may adjust the beam's polarization depending on the control signal 30 from the laser control electronics. The beam now is split, partially transmitted out of the laser cavity and partially reflected by the polarizer to the rod/pump assembly, depending upon the beam's polarization. The modulator control is provided by the laser control electronics which receives its inputs from the laser detector assembly and from the external commands through the communication electronics 32 in a manner hereinafter described.

Figure 2:
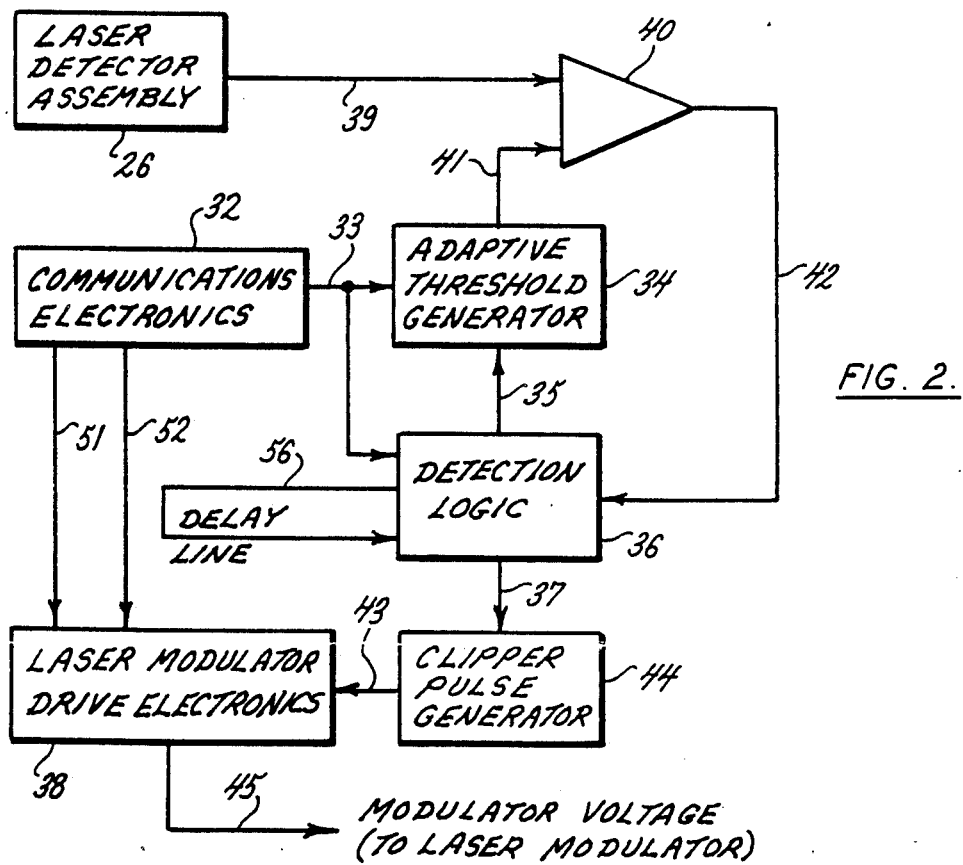
FIG. 2 illustrates a block diagram of the laser control electronics.

The laser control electronics is functionally illustrated in FIG. 2. The laser control electronics receives its input from the communication electronics 32 and the laser detector assembly 26. The communication electronics receives its input from external commands and provides a clipper control signal 33 to an adaptive threshold generator 34 and a detection logic circuit 36. The communication electronics also provides control signals directly to a laser modulator drive electronics 38 for amplification so as to adjust the modulator voltage. The laser detector assembly produces a scaled sample of the circulating power within the laser cavity and provides a clipper video signal 39 to a comparator 40. The comparator 40 generates a detection signal 42 which is transmitted to the detection logic circuit once the laser detector assembly's output reaches the threshold voltage level 41 set by the adaptive threshold generator 34. The detection logic circuit which receives the clipper control signal 33 from the communication electronics and the detection signal 42 from the comparator provides clip miss 35 and clip 37 outputs to the adaptive threshold generator 34 and a clipper pulse generator 44, respectively. The adaptive threshold generator 34 receives input control signals from the communication electronics and the detection logic circuit and provides an output threshold level 41 to the comparator which is adjusted according to the ratio of signals detected to signals missed in a manner hereinafter described. The clipper bias output 43 of the laser control electronics is produced by the clipper pulse generator upon an appropriate signal from the detection logic circuit and is amplified by the laser modulator drive electronics to form the modulator voltage 45 which controls the laser cavity's modulator. The output of the clipper pulse generator signals the laser modulator drive electronics 38 if the circulating power in the laser cavity reaches the threshold level and biases the modulator drive electronics to clip the laser's circulating power.

Figure 3:
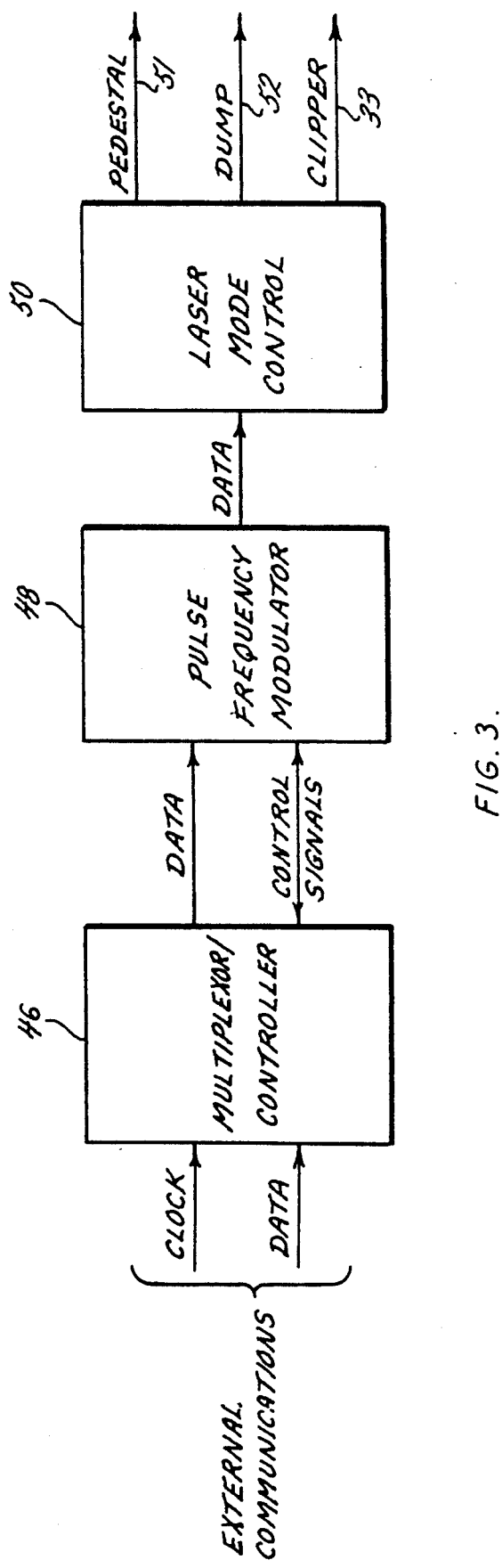
FIG. 3 illustrates the block diagram for the communications electronics.

The communication electronics provides the control signals to the laser control electronics based upon the clock and data signals provided by the external commands as shown in FIG. 3. The input data is passed from the multiplexer/controller 46 to the pulse frequency modulator 48 which translates the data into the requisite format so as to be transmitted by pulse interval modulation by the laser. The formatted data is then transferred to the laser mode control 50 which converts the data into the appropriately timed pedestal 51, dump 52, and clipper 33 output signals by adjusting the pulse width of a pedestal timing signal.

Figure 4:
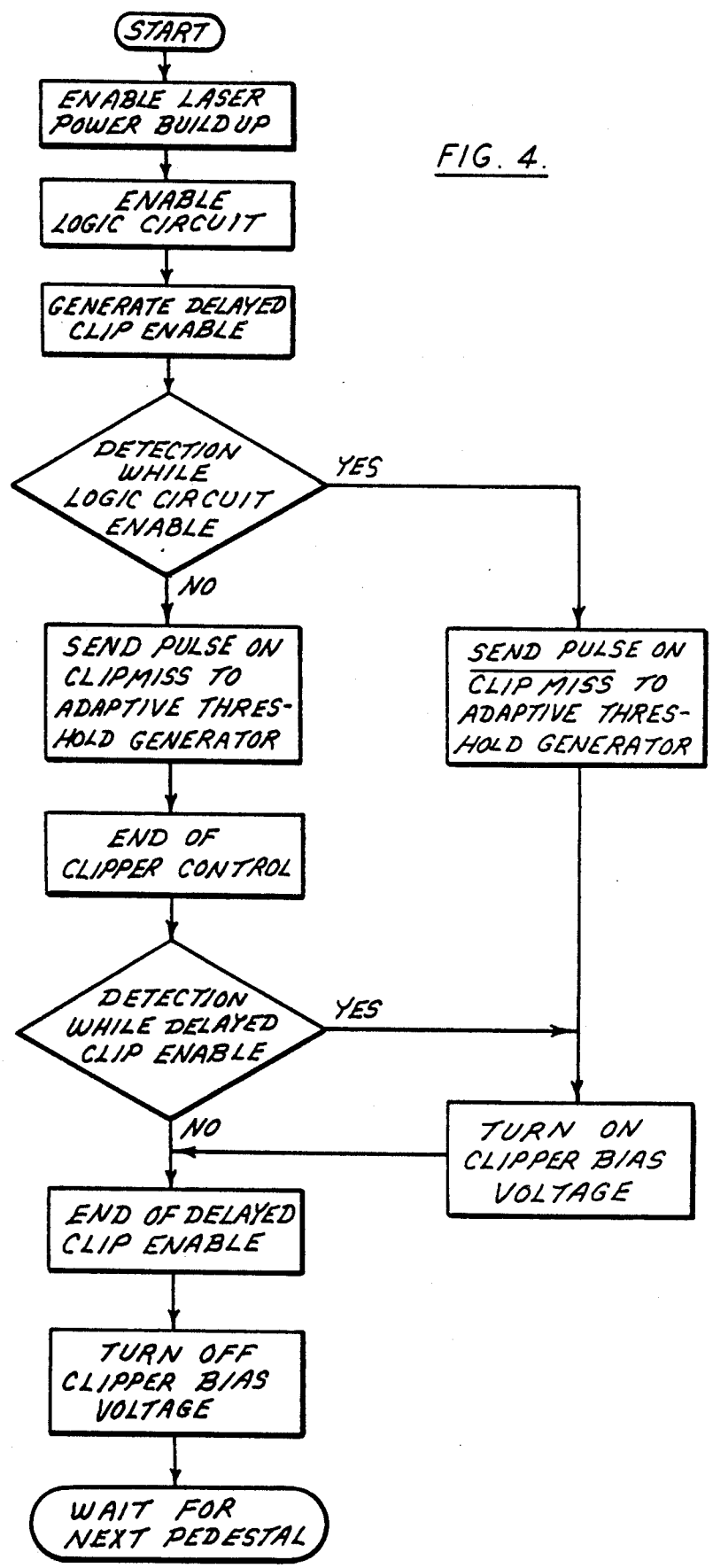
FIG. 4 illustrates a logic control flow chart for the detection logic circuit shown in FIG. 2.

The detection logic circuit's flowchart is shown in FIG. 4. Once the detection logic circuit and the laser power buildup have been enabled by the falling-edge of the pedestal signal in a manner hereinafter explained, the detection logic circuit generates a delayed clipper signal by routing the clipper input signal through its delay lien 56 shown in FIG. 2 so as to delay the clipper signal 20 nanoseconds. The delay line enables the circulating power to reach the threshold level and to be clipped if within 20 nanoseconds of the falling-edge of the clipper signal the circulating power had increased to the threshold level so as to trigger the detection output signal by the comparator. The delay line allows more circulating power buildups to be clipped and thus provides a more standardized output pulse level.

The detection logic circuit then monitors the detection input signal to see if the threshold level is reached within the laser cavity while the clipper signal is still active. If the threshold level is reached, the detection logic circuit maintains the clip miss output signal at a low level while if the threshold level is not reached, the detection logic circuit raises the clip miss signal to a high level. Additionally, if the threshold level had not been reached by the time the clipper signal becomes inactive, the detection logic circuit monitors the detection input for an additional 20 nanoseconds due to the delayed clipper signal. If the threshold level is reached at any point before the inactivation of the delayed clipper signal the detection logic circuit sends a clip signal to the clipper pulse generator to activate the clipper bias voltage as soon as the detection signal was received. Following the end of the delayed clipper signal, the clip signal is removed so as to deactivate the clipper bias voltage. Finally, the detection logic circuit monitors for the next pedestal signal so as to enable the laser power buildup and the detection logic circuit to begin the detection logic's functional flowchart once again.

Figure 5:
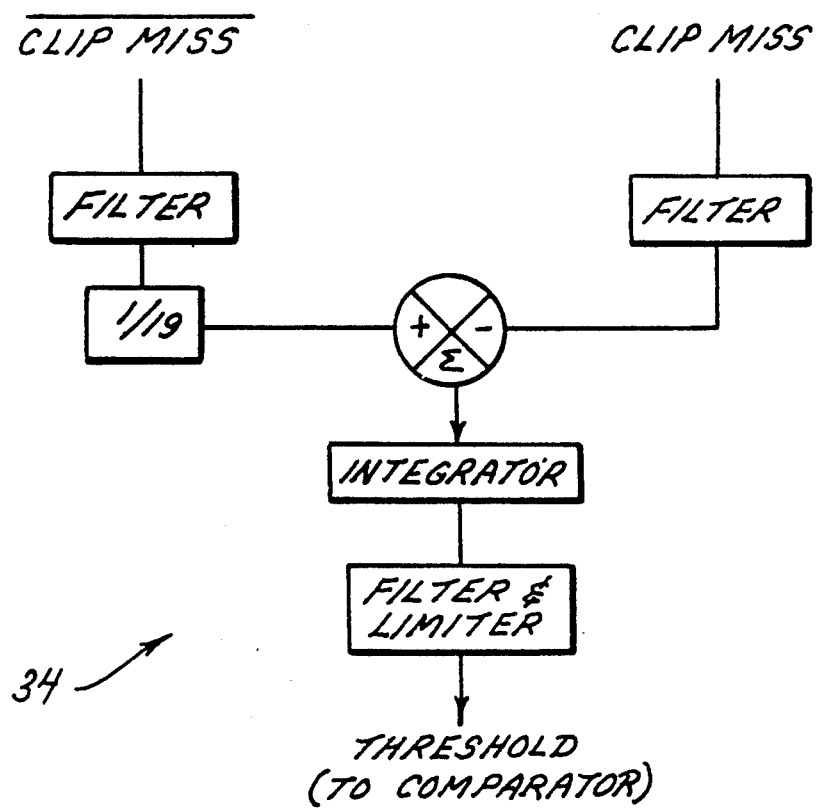
FIG. 5 illustrates a logic control flow chart for the adaptive threshold generator shown in FIG. 2.

As shown by the flowchart in FIG. 5, the adaptive threshold generator 34 adjusts the threshold level which is compared to the circulating power within the laser. The adaptive threshold generator receives its input, clip miss, from the detection logic circuit. Clip miss is high and signals a miss if the circulating power had not reached the threshold level by the time of the falling-edge of the delayed clipper control signal. Alternatively, clip miss is low if the threshold level had been reached and the circulating power was clipped and thus signals a detect. The clip miss signal is then filtered and scaled so as to achieve the appropriate ratio of detects to misses, 19 to 1 in this example. Following the signal's summation and integration, the adaptive threshold generator's output is again filtered and limited to insure that an individual detect or miss is not responded to, but instead that a time-average of the ratio of detects to misses is used as a reference. The threshold output from the adaptive threshold generator is then raised if the ratio of detects to misses is greater than 19 to 1 or is lowered if the ratio of detects to misses is less than 19 to 1. This process insures that a consistent percentage of the circulating power buildups are clipped so as to maintain an approximately constant output pulse power level.

The clipper pulse generator 44, essentially consisting of a comparator and a regulated voltage source is used to determine when the clip signal is raised high and to output the clipper bias voltage upon the activation of the clip signal.

Figure 6:
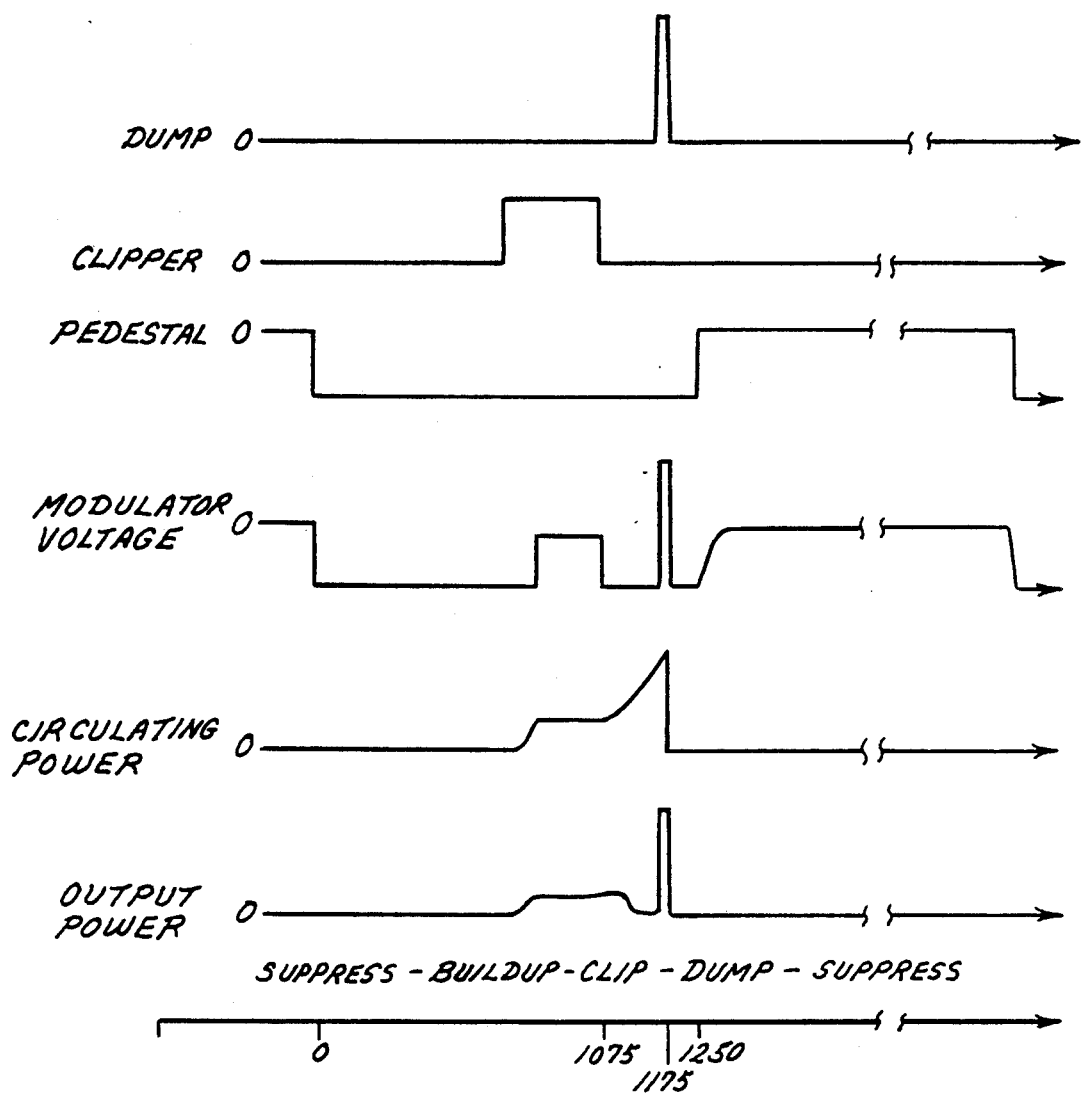
FIG. 6 illustrates the timing diagram for the laser controller shown in FIG. 1 where the circulating power is clipped at the threshold level.

The laser modulator drive electronics is a set of amplifiers with the appropriate gain ratios so as to provide the necessary modulator voltage output based upon the pedestal, dump, and clipper bias input signals. As shown in FIG. 6 and subsequently explained, a positive clipper bias signal generates a positive modulator pulse at an intermediate voltage level. A negative-going pedestal pulse triggers the modulator voltage to fall to a zero voltage, while a dump pulse causes a large modulator voltage pulse. Alternatively, if the dump and clipper bias signals are inactive and pedestal is at a high voltage level, the modulator voltage is set at an intermediate level so as to suppress lasing within the cavity.

Figure 7:
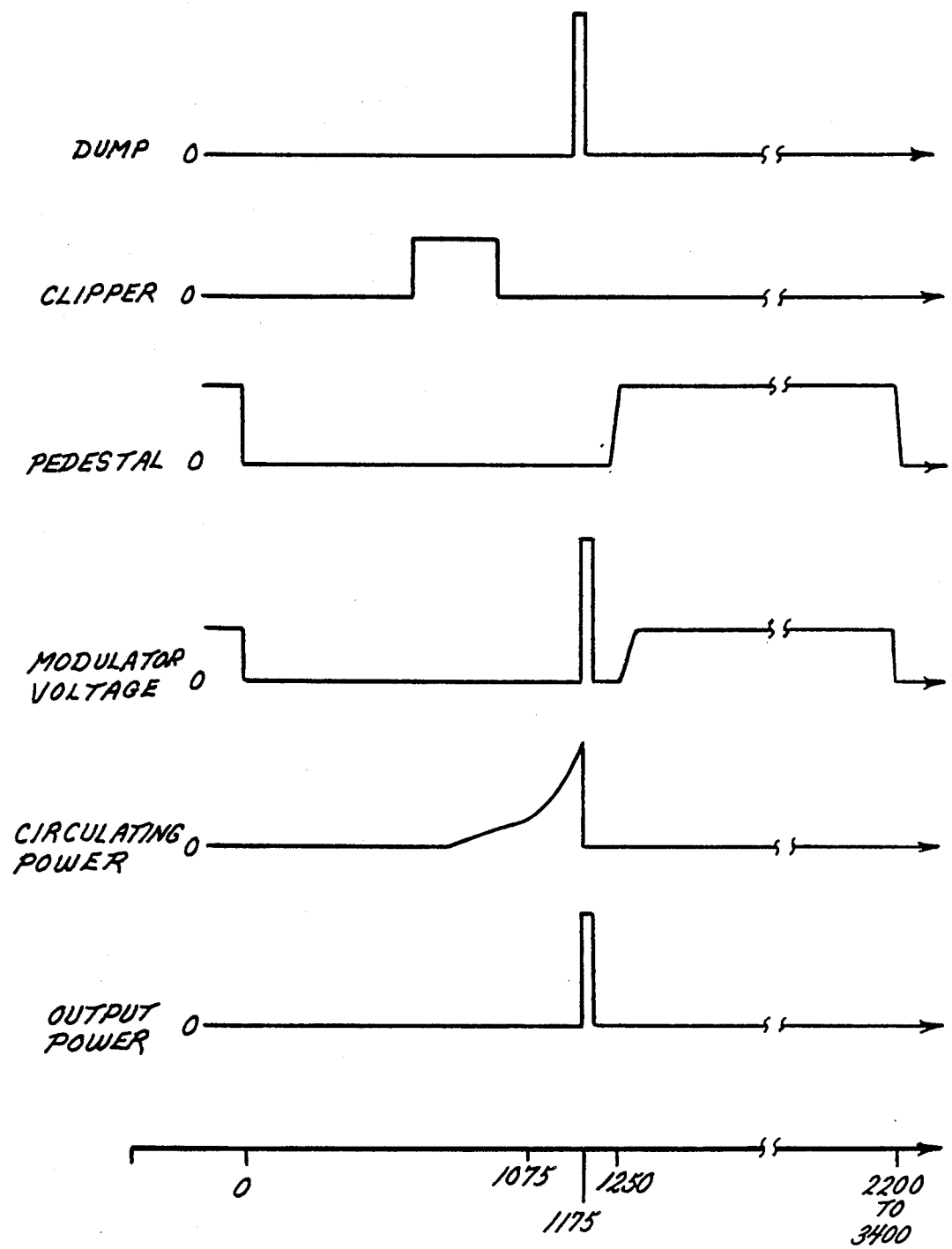
FIG. 7 illustrates a timing diagram for the cavity dump controller where the circulating power is low and represents a miss.

The timing diagrams for the control input and output signals are shown in FIGS. 6 and 7 with FIG. 6 representing a situation wherein a "detect" occurs and FIG. 7 representing a situation wherein a "miss" occurs.

The pedestal signal, as shown in FIGS. 6 and 7, controls the timing of the output power pulses. Pedestal is a fixed average frequency signal whose pulse period is varied so as to provide the pulse interval modulation for the laser communications system in a manner hereinafter explained. The clipper signal and the dump signal provide positive pulses of a predetermined width which occur following the elapse of a fixed time interval after the falling-edge of the pedestal signal. For example, the time scales for FIGS. 6 and 7 show that the dump signal occurs 1175 nanoseconds after the pedestal signal experiences a high-to-low transition.

The falling-edge of the pedestal signal triggers the modulator voltage to fall from an intermediate level which had suppressed a buildup of power within the laser cavity to a zero voltage level which allows a buildup of circulating power within the laser cavity. The level of circulating power is detected by the laser detector assembly, shown in FIG. 2, and transmitted to the high-speed comparator of the cavity-dump laser controller as the clipper video signal. The clipper video signal is compared with the threshold signal by the comparator in FIG. 2 and a detection signal is output to the detection logic circuit. The threshold signal is set at a predetermined voltage level and adjusted by the adaptive threshold generator as previously described.

Once the comparator detects that the clipper video signal has risen to the threshold level, the detection output signal will transmit this occurrence to the detection logic circuit. If this detection signal is received by the detection logic circuit prior to the falling-edge of the clipper signal the detection logic circuit will register a "detect", otherwise a "miss" will be register. The modulator voltage is also raised from a low level to an intermediate level if the circulating power of the laser reaches its threshold level prior to the falling-edge of the delayed clipper signal. The delayed clipper signal is identical to the clipper signal with the addition of a delay of approximately 20 nanoseconds. The delay is imposed by the delay line of the detection logic as shown in FIG. 2. The intermediate voltage level of the modulator voltage signal will clip the circulating power which will remain at a constant level until the modulator voltage signal is subsequently changed.

Upon the falling-edge of the delayed clipper signal, the modulator voltage level is returned to a low voltage level if it had previously been raised to an intermediate voltage level by the circulating power having reached the threshold level. If the circulating power buildup had been clipped by the intermediate modulator voltage level as shown in FIG. 6, it is now released to continue to increase. If the circulating power had not yet reached the threshold level by the time the delayed clipper signal's falling-edge occurred as shown in FIG. 7, the circulating power is never clipped and will continue to increase unimpeded. One hundred nanoseconds after the falling-edge of the clipper signal the dump signal pulses high. The dump signal forces the modulator voltage to pulse high which in turn causes the laser to dump it power in an output pulse as shown in FIGS. 6 and 7. The process then begins again with the modulator returning to an intermediate voltage level so as to prevent lasing until the pedestal undergoes another high-to-low transition which occurs in FIGS. 6 and 7 at 2200 to 3400 nanoseconds, the range of pulse interval modulation, on the time scale.

Although there has been illustrated and described specific detail and structure of operations, it is clearly understood that the same were merely for purposes of illustrations and that changes and modifications may be readily made therein by those skilled in the art without departing from the spirit and the scope of this invention.

I claim:

1. An apparatus for cavity dumping a laser comprising:
   (a) a laser cavity having means for providing radiating oscillation within the cavity;
   (b) laser control electronic means for providing pulse interval control of the laser to dump high frequency laser output pulses;
   (c) detection means for detecting circulating power of said laser cavity;
   (d) comparator means for comparing a level of circulating power in the laser cavity to a predetermined threshold level;
   (e) feedback means for supplying a signal to an adaptive threshold generator means for adjusting the predetermined threshold level to the comparator means in response to the circulating power build up in the laser cavity; and
   (f) clipper pulse generating means for producing a clip pulse to the laser control electronics to clip the laser's circulating power when the predetermined threshold level is reached.

2. The apparatus for cavity dumping a laser as recited in claim 1 further comprising a delay means for delaying the clip pulse to the laser control electronics when the circulating power is less than the predetermined threshold level.

3. The apparatus for cavity dumping a laser as recited in claim 2 wherein the laser cavity further comprises a diode pumped rod assembly which provides the radiating oscillation within the laser cavity.

4. The apparatus for cavity dumping a laser as recited in claim 2 wherein the laser cavity further comprises an electrooptic modulator means for clipping the circulating power at the predetermined threshold level.

5. An apparatus for cavity dumping a laser comprising:
   (a) a laser cavity having means for providing radiating oscillation within the cavity;
   (b) laser control electronic means for providing pulse interval control of the laser to dump high frequency laser output pulses;
   (c) detection means for detecting circulating power of said laser cavity;
   (d) comparator means for comparing a level of circulating power in the laser cavity to a predetermined threshold level;
   (e) feedback means for supplying a signal to an adaptive threshold generator means to adjusting the predetermined threshold level to the comparator means in response to the circulating power build up in the laser cavity wherein the adaptive threshold generator means comprises means for adjusting the predetermined threshold level based on the ratio of the number of times the circulating power is clipped to the number of times the circulating power is not clipped such that the threshold level is adjusted to maintain the predetermined ratio; and
   (f) clipper pulse generating means for producing a clip pulses to the laser control electronics to clip the laser's circulating power when the predetermined threshold level is reached.

* * * * *